(12) United States Patent
Evenkamp et al.

(10) Patent No.: US 11,411,518 B2
(45) Date of Patent: Aug. 9, 2022

(54) GENERATOR COOLING

(71) Applicant: Siemens Energy Global GmbH & Co. KG, Munich (DE)

(72) Inventors: Monja Evenkamp, Essen (DE); Markus Murawa-Galen, Herne (DE); Hendrik Steins, Essen (DE); Bernd Strobel, Rastede (DE)

(73) Assignee: SIEMENS ENERGY GLOBAL GMBH & CO. KG (DE)

( * ) Notice: Subject to any disclaimer, the term of this patent is extended or adjusted under 35 U.S.C. 154(b) by 753 days.

(21) Appl. No.: 16/316,089

(22) PCT Filed: Jun. 27, 2017

(86) PCT No.: PCT/EP2017/065838
§ 371 (c)(1),
(2) Date: Jan. 8, 2019

(87) PCT Pub. No.: WO2018/015115
PCT Pub. Date: Jan. 25, 2018

(65) Prior Publication Data
US 2021/0297023 A1 Sep. 23, 2021

(30) Foreign Application Priority Data

Jul. 22, 2016 (DE) ..................... 10 2016 213 469.8

(51) Int. Cl.
*H02P 9/00* (2006.01)
*H02K 9/12* (2006.01)
(Continued)

(52) U.S. Cl.
CPC ......... *H02P 9/006* (2013.01); *G05D 23/1931* (2013.01); *H02K 9/10* (2013.01);
(Continued)

(58) Field of Classification Search
CPC . H02P 9/006; H02K 9/10; H02K 9/12; H02K 2213/09; H02K 15/125
See application file for complete search history.

(56) References Cited

U.S. PATENT DOCUMENTS

| 10,763,727 B2 * | 9/2020 | Lang ........................ H02K 9/04 |
| 2003/0080636 A1 * | 5/2003 | Boardman ............... H02K 9/18 310/58 |

(Continued)

FOREIGN PATENT DOCUMENTS

| BR | PI1105754 A2 * | 1/2013 | ............... H02K 9/12 |
| CA | 2752305 A1 * | 3/2012 | ............... H02K 9/12 |

(Continued)

OTHER PUBLICATIONS

PCT International Search Report and Written Opinion of International Searching Authority dated Oct. 6, 2017 corresponding to PCT International Application No. PCT/EP2017/065838 filed Jun. 27, 2017.

*Primary Examiner* — Pedro J Cuevas
(74) *Attorney, Agent, or Firm* — Schmeiser, Olsen & Watts LLP

(57) ABSTRACT

Provided is a method for controlling the cold gas temperature of a cooling gas of a closed generator cooling gas circuit of a generator having at least one cooler through which a cooling fluid flows. The method includes: a) defining cold gas temperature setpoint values in dependence on the stator and rotor current of the generator; b) detecting the current cold gas temperature; c) detecting the current stator and rotor current; d) determining the cold gas temperature setpoint value associated with the stator and rotor current detected in step c); e) regulating the cold gas temperature by changing the volumetric flow of the cooling fluid supplied to the at least one cooler as a function of the difference between the current cold gas temperature detected in step b) and the (Continued)

cold gas temperature setpoint value determined in step d); and f) repeating steps b) to e) at defined time intervals.

13 Claims, 4 Drawing Sheets

(51) Int. Cl.
  *H02K 9/10* (2006.01)
  *H02K 15/12* (2006.01)
  *G05D 23/19* (2006.01)
  *F28D 21/00* (2006.01)
  *F28F 27/02* (2006.01)

(52) U.S. Cl.
  CPC .............. *H02K 9/12* (2013.01); *H02K 15/125* (2013.01); *F28D 2021/0028* (2013.01); *F28F 27/02* (2013.01); *H02K 2213/09* (2013.01)

(56) References Cited

U.S. PATENT DOCUMENTS

| | | | | |
|---|---|---|---|---|
| 2004/0066099 A1* | 4/2004 | Weeber | ................ | H02K 55/04 |
| | | | | 310/58 |
| 2004/0084974 A1* | 5/2004 | Nelson | ................ | H02K 9/06 |
| | | | | 310/58 |
| 2004/0222711 A1* | 11/2004 | Klimt | ................ | H02K 9/18 |
| | | | | 310/59 |
| 2010/0026145 A1* | 2/2010 | Iwai | ................ | H02K 9/18 |
| | | | | 310/60 A |
| 2010/0176670 A1* | 7/2010 | Gottfried | ................ | H02K 1/20 |
| | | | | 310/61 |

FOREIGN PATENT DOCUMENTS

| | | | | | |
|---|---|---|---|---|---|
| CH | 703819 | A1 | * | 3/2012 | ............... H02K 9/12 |
| CN | 202616932 | U | | 12/2012 | |
| CN | 102412663 | B | * | 4/2016 | ............... H02K 9/12 |
| DE | 102012022421 | A1 | | 5/2014 | |
| EP | 1612916 | A1 | | 1/2006 | |
| EP | 2431702 | A2 | | 3/2012 | |
| EP | 2431702 | A2 | * | 3/2012 | ............... H02K 9/12 |
| EP | 2605379 | A1 | * | 6/2013 | ............... H02K 11/25 |
| EP | 2658097 | A1 | | 10/2013 | |
| EP | 2431702 | A3 | * | 8/2015 | ............... H02K 9/12 |
| EP | 2431702 | B1 | * | 10/2020 | ............... H02K 9/12 |
| JP | 2008067471 | A | | 3/2008 | |
| KR | 101568124 | B1 | * | 11/2015 | ............... H02K 9/12 |
| RU | 2543060 | C2 | * | 2/2015 | ............... H02K 9/12 |

* cited by examiner

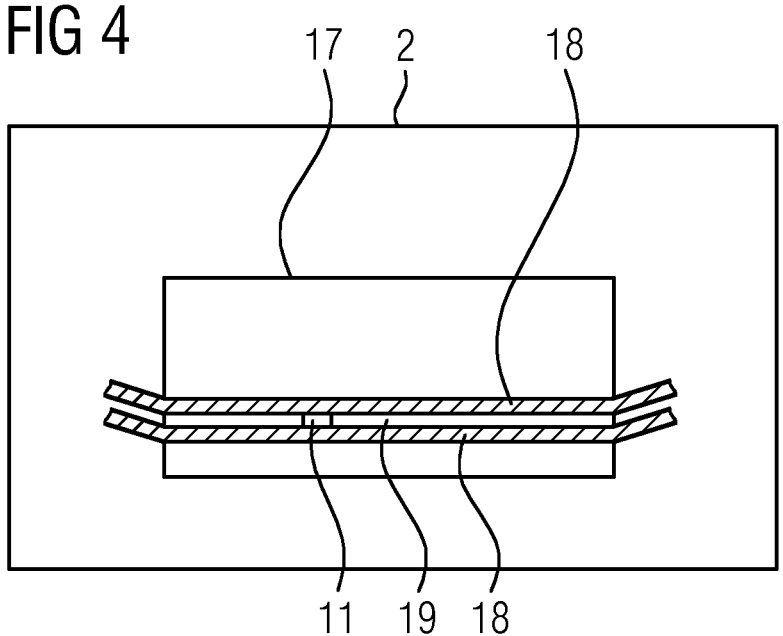

GENERATOR COOLING

CROSS REFERENCE TO RELATED APPLICATIONS

This application claims priority to PCT Application No. PCT/EP2017/065838, having a filing date of Jun. 27, 2017, based off of German Application No. 10 2016 213 469.8, having a filing date of Jul. 22, 2016, the entire contents of which are hereby incorporated by reference.

FIELD OF TECHNOLOGY

The following relates to a method for controlling the cold gas temperature of a cooling gas of a closed cooling gas circuit of a generator, which circuit has at least one cooler through which flows a cooling liquid.

BACKGROUND

The cold gas temperature of cooling gases of closed generator cooling circuits has up to now always been statically controlled. In other words, the controlling is designed in such a way that the cooling gas of the generator is adjusted just once when the generator cooling gas circuit is put into operation so that during the intended power operation a temperature distribution of the generator components is adjusted to a desired temperature level inside the generator. The cooling liquid volumetric flow through the cooler, then permanently selected, is therefore independent of the operating mode of the generator, which distinguishes startup operation, power operation, shutdown operation and turning operation. This basically leads to the generator being cooled over-dimensionally during power operation in the case of low load and partial load and also during startup and shutdown processes. In the case of the previous operating modes of conventional power plants during base load and medium load operation, in which the generator is operated with constant output over a very long period of time, this intense cooling during low load, partial load operation and during startup and shutdown processes played a very subordinate role, however.

The constantly increasing proportion of power generation from volatile sources, however, leads to the demands of the national electricity grid upon generators to be constantly changing. For the operating mode of a generator, this results in an execution of a large number of start-stop cycles and a frequent changing of the power point, that is to say a high number of steep load gradients and a frequent low-load and partial-load operation. Accordingly, generators in most cases are no longer in thermally steady-state stationary operation.

Resulting from this, the temperature levels inside the generator are subjected to very high and frequent fluctuations which, on account of an extremely wide variety of thermal expansion coefficients of the respective generator components, induce thermomechanical stresses, especially in the region of the winding bar connection. This leads to accelerated ageing of the generator components, which in particular affects the insulation system of the generator.

SUMMARY

An aspect relates to create an alternative method of the type referred to in the introduction which reacts to different operating modes of the generator in a flexible manner.

For achieving this aspect, embodiments of the present invention creates a method of the type referred to in the introduction which comprises the steps:

a) defining cold gas temperature setpoint values in dependence of the stator and rotor current of the generator, wherein the cold gas temperature setpoint values especially have a predetermined margin in relation to cold gas thermal protection values of a protection system of the generator;
b) detecting the prevailing cold gas temperature;
c) detecting the prevailing stator and rotor current;
d) determining the cold gas temperature setpoint value which is associated with the stator and rotor current detected in step c);
e) controlling the cold gas temperature by altering the volumetric flow of the cooling liquid which is fed to the at least one cooler in dependence of the difference between the prevailing cold gas temperature detected in step b) and the cold gas temperature setpoint value determined in step d); and
f) repeating steps b) to e) within defined time intervals.

Owing to the fact that the cold gas temperature setpoint values are defined in dependence of the stator and rotor current of the generator, to which they are indirectly proportional, and the cold gas temperature is then controlled in dependence of a cold gas temperature setpoint value which is associated with the prevailing stator and rotor current, it can be ensured that the cooling which is produced by the cold gas is adapted at least in most cases to the current operating state of the generator, as a result of which a more uniform temperature level is achieved inside the generator and the emergence or the frequency of thermomechanical stresses is reduced. The cold gas temperature setpoint values are in this case advantageously selected with a margin in relation to so-called cold gas thermal protection values of the protection system of the generator if a generator protection system is provided. Such a generator protection system serves for automatically shutting down or running down the generator when the cold gas thermal protection values are exceeded in order to prevent damage to the generator. The controlling of the cold gas temperature is carried out according to embodiments of the invention by altering the volumetric flow of the cooling liquid which is fed to the at least one cooler, as a result of which the current cooling capacity of the cooler is varied.

The cold gas temperature setpoint values defined in step a) in dependence of the stator and rotor current of the generator lie below the cold gas thermal protection values in the corresponding stator and rotor current. Therefore, it can be ensured that sufficient margin in relation to the critical temperatures, which lead to the shutting down of the generator, is maintained.

The prevailing cold gas temperature is advantageously detected in step b) at a number of positions at the same time and only the maximum prevailing cold gas temperature is taken into consideration during the controlling in step e). As a result of the redundant detection of the cold gas temperature, the reliability of the method is increased, especially when one of the temperature sensors malfunctions.

The maximum value of the detected prevailing stator current and of the detected prevailing rotor current is determined in step c), wherein the cold gas temperature setpoint value which is associated with the maximum value is determined in step d).

According to one embodiment of the method according to embodiments of the invention, the prevailing hot gas temperature is detected and taken into consideration during the controlling in step e). The detection of the prevailing hot gas temperature also serves for increasing the reliability of the method. Therefore, for example a maximum hot gas temperature, which must not be exceeded, can be defined.

The prevailing hot gas temperature is detected at a number of positions at the same time and only the maximum prevailing hot gas temperature is taken into consideration during the controlling in step e). As a result of these redundant measurements, the reliability of the method is increased, especially when one of the temperature sensors malfunctions.

The prevailing cooling liquid temperature is advantageously detected before entry into the cooler and taken into consideration during the controlling in step e). In this way, the accuracy of controlling can be increased.

According to a further embodiment of the method according to embodiments of the invention, the prevailing stator and/or rotor temperature of the generator is detected and taken into consideration during the controlling in step e), which also contributes to accuracy of controlling.

In the case of specific designs of the generator—with directly gas-cooled stator winding bars—the prevailing cooling gas temperature at the bar exit of the stator winding of the generator can also be detected and taken into consideration during the controlling in step e).

The differential of stator current or rotor current to the time is determined and taken into consideration as a vanishing impulse during the controlling in step e), as a result of which the accuracy and reaction speed of the controlling is improved.

The generator cooling circuit advantageously has a plurality of coolers, wherein the volumetric flows of cooling liquid which is fed to the respective coolers are altered in step e). A plurality of coolers have the advantage that cooling remains at least partially functional even in the event of a malfunction of one of the coolers.

A heating device is provided for optional heating of the cooling liquid which enters the cooler. Such a heating device is particular advantageous to the effect that cooling down of the generator during turning operation can be prevented, as a result of which the temperature difference to the mechanically stress-free state is reduced. The cooler can therefore be selectively also used as a heat exchanger which yields heat to the cooling gas.

According to a specific embodiment of the method according to embodiments of the invention, the generator cooling gas circuit is a component part of a power plant.

BRIEF DESCRIPTION

Some of the embodiments will be described in detail, with reference to the following figures, wherein like designations denote like members, wherein:

FIG. 4 shows a schematic view of a possible arrangement of temperature measuring devices which are designed as slot resistance thermometers.

DETAILED DESCRIPTION

Figure 1:
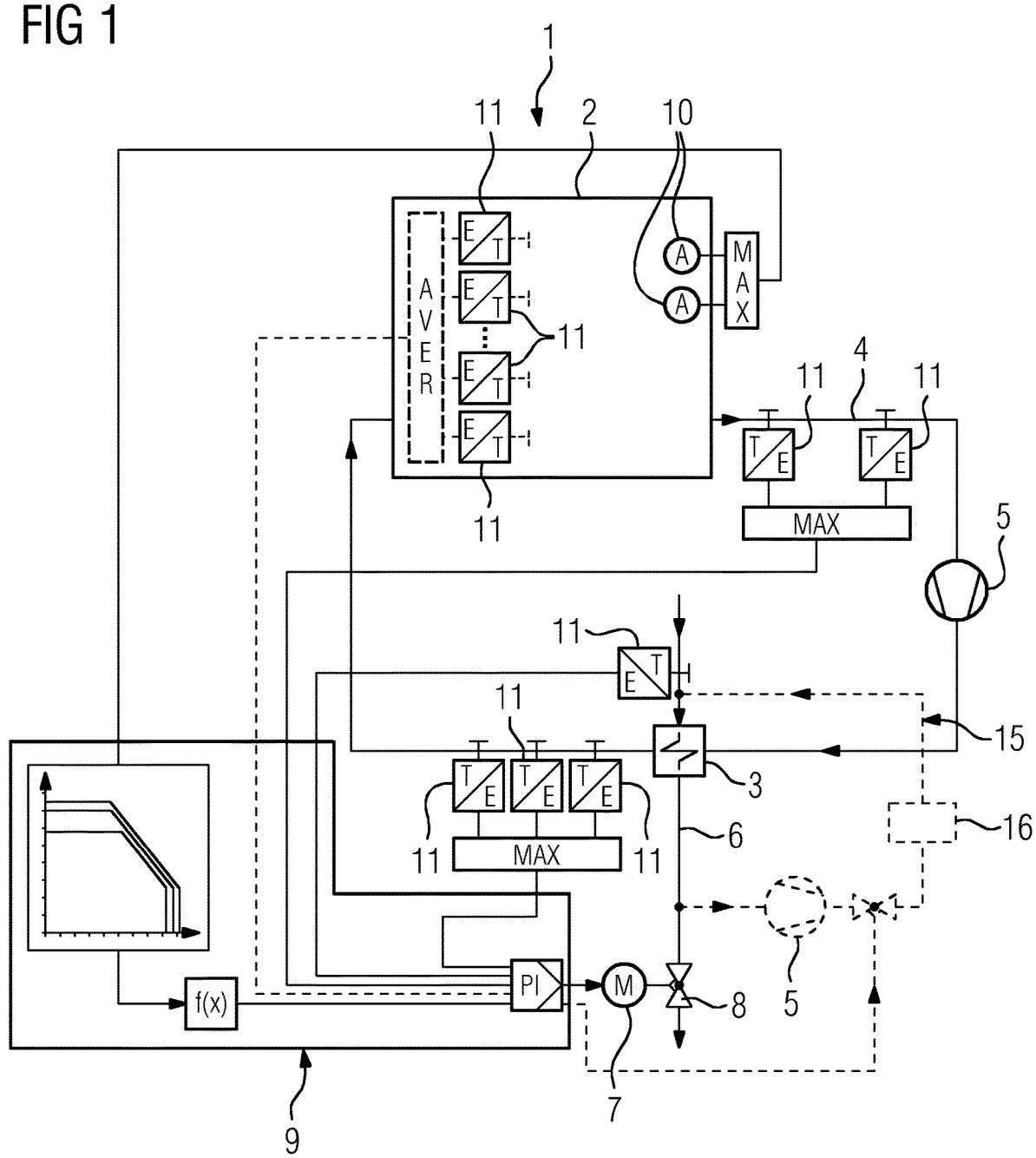
FIG. 1 shows a schematic view of a cooling gas circuit 1 and of a control system which controls the cold gas temperature of the cooling gas which flows through the cooling gas circuit.

FIG. 1 shows a closed generator cooling circuit 1 through which a cooling gas, for example in the form of air or molecular hydrogen ($H_2$), is directed in a clockwise direction in the present case, and which has a generator 2, provided with a cold gas thermal protection system, a cooler 3, a cooling gas line 4 which interconnects the generator 2 and the cooler 3, and a delivery device 5. Flowing through the cooler 3 on one side is cooling gas coming from the generator 2, which is also referred to below as hot gas, and on the other side a cooling liquid, for example in the form of cooling water, which is fed via a cooling liquid line 6. The cooler is designed for the purpose cooling hot gas leaving the generator 2 by means of yielding heat to the cooling liquid for creating cold gas which is then fed again to the generator 2. With constant volumetric flow of the cooling gas, the cooling capacity of the cooler 3 is in dependence of the volumetric flow of the cooling liquid directed through this and can be adjusted via the control valve 8 which in the present case is provided with an actuating drive 7 and is arranged downstream of the cooler 3.

For controlling the cold gas temperature by altering the volumetric flow of the cooling liquid which flows through the cooler 3, provision is made for a control device 9, which is connected to the actuating drive 7 of the control valve 8, and for a series of sensors or measuring devices which transmit the data detected by them to the control device 9. Arranged in the generator 2 are current measuring devices 10 which detect the prevailing stator current and the prevailing rotor current of the generator 2. Also, a plurality of temperature measuring devices 11, which sense the prevailing temperatures of generator components, are positioned inside the generator 2. Therefore, the temperature measuring devices 11 which are arranged inside the generator 2 can be provided for example in the form of slot resistance thermometers, to name but one example. Further temperature measuring devices 11 are arranged inside the cooling gas line 4 in the present case, specifically upstream between the cooler 3 and the generator 2 for detecting the cold gas temperature on one side and downstream between the generator 2 and the cooler 3 for detecting the hot gas temperature on the other side. A further temperature measuring device 11 is positioned in the cooling liquid line 6 upstream of the cooler 3 in order to detect the cooling liquid temperature before entry into the cooler 3.

Figure 2:
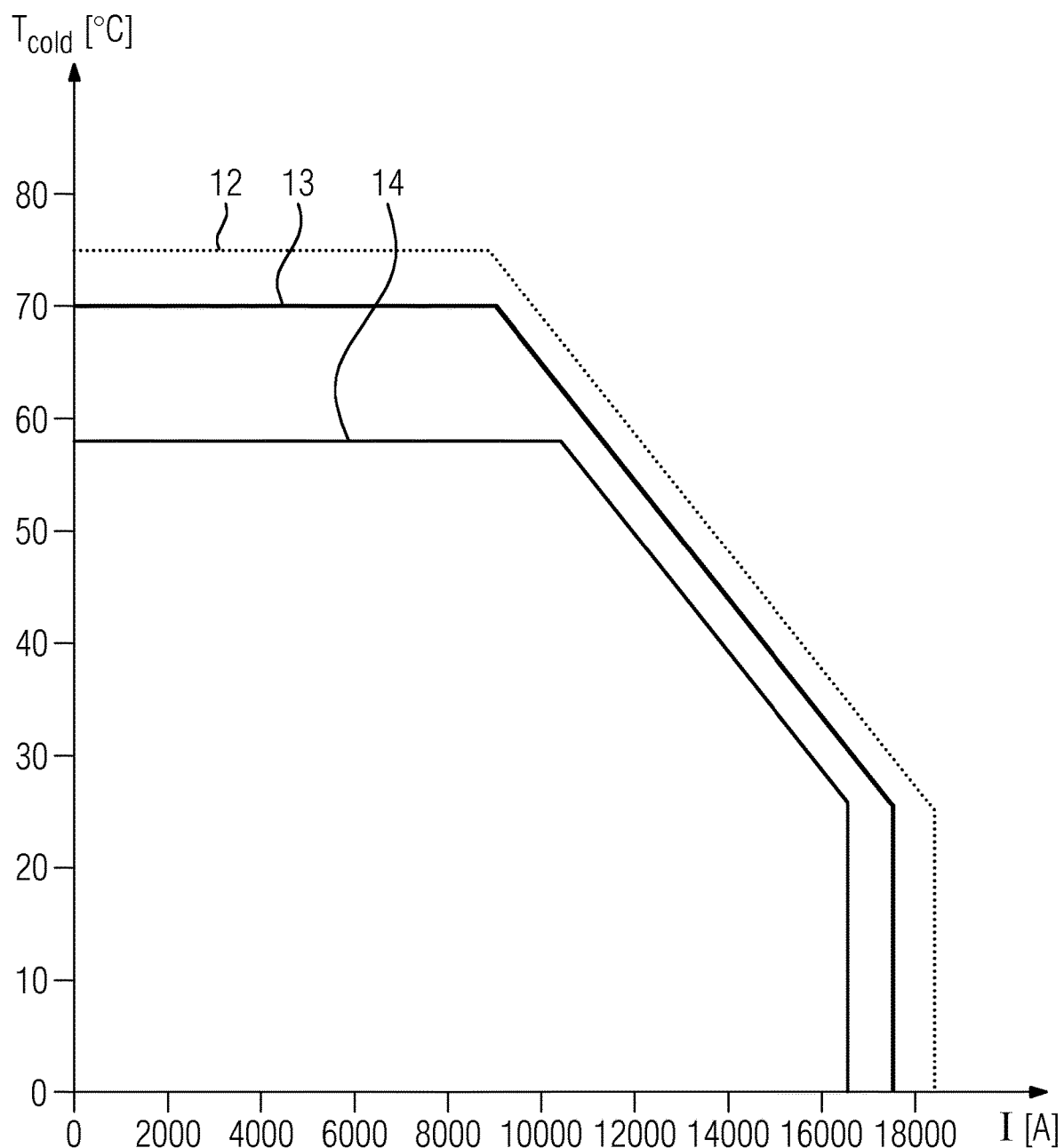
FIG. 2 shows a graphic view which shows the cold gas temperature setpoint values in dependence of the stator and rotor current of the generator.

For controlling the cold gas temperature, according to embodiments of the invention cold gas temperature setpoint values were defined in advance in dependence of the stator and rotor current of the generator 2 and stored in the control device 9, wherein the cold gas temperature setpoint values in the present case have a predetermined margin in relation to cold gas thermal protection values of the cold gas thermal protection system of the generator 2, as is explained in more detail below with reference to FIG. 2. FIG. 2 shows a graph, on the X-axis of which is plotted the stator and rotor current I in amperes, and on the Y-axis of which is plotted the cold gas temperature T in ° C. In the graph, the line 12 represents the cold gas thermal protection values of a cold gas thermal protection system which is common for example in power plants, that is to say those temperatures which when being reached a turbo generator set for example which is arranged upstream of the generator 2, with correspondingly associated stator and rotor current, is compulsorily shut down, in order to prevent overheating of the generator 2. The line 13 extends in the main parallel to the line 12 in the direction of lower temperatures and represents the warning values of the cold gas thermal protection system which when being exceeded an alarm is triggered for the operating personnel who are made aware of the fact that a shutdown of the turbogenerator set is shortly to occur.

Line 14 represents the cold gas temperature setpoint values according to embodiments of the invention in dependence of the stator and rotor current of the generator 2. In the present case it extends in the main parallel to the line 12 in the direction of lower temperatures and advantageously has a measured safety margin in relation to the line 13 in order to prevent the cold gas temperatures being able to reach the level of the warning values of the cold gas thermal protection system during an uninterrupted operation of the generator. The safety margin in relation to line 13 should, however, be small enough to permit temperatures which are as high as possible. The safety factor advantageously lies within the range of between 2.5 and 7.5%.

During the operation of the generator 2, the prevailing cold gas temperature is detected by means of the temperature measuring devices 11 which are arranged in the cooling gas line 4 between the cooler 3 and the generator 2, the maximum value of the detected temperatures is determined and transmitted to the control device 9. The redundant detection of the prevailing cold gas temperature and the determination of the maximum value serves in this case for increasing the reliability and the accuracy of controlling. Also, the prevailing stator current and the prevailing rotor current are detected by means of the current measuring devices 10. Then, based on the previously defined cold gas temperature setpoint values, the cold gas temperature setpoint value which is associated with the maximum detected current value is assigned to the maximum detected current value which is taken into account in the controlling. In addition, in the present case the prevailing cooling liquid temperature before entry into the cooler 3 is detected using the temperature measuring device 11 which is arranged at a corresponding position in the cooling liquid line 6, and is transmitted to the control device 9. This is especially of importance if the temperature of the cooling liquid fluctuates to a considerable degree, for example if river water, which is exposed to extremely variable ambient temperatures due to the seasons of the year, is used as cooling liquid. The prevailing cooling liquid temperature can then be taken into account in the controlling by the cold gas temperature setpoint value being multiplied by a suitable factor, to name but one example. Also, in the present case the prevailing hot gas temperature is repetitively detected using the temperature measuring devices 11 which are arranged in the cooling gas line 4 between the generator 2 and the cooler 3, the maximum value of said temperature then being transmitted to the control device 9. The prevailing hot gas temperature can also be taken into consideration by a corresponding factor or the like during the controlling. The redundant temperature measuring also serves here for increasing accuracy and reliability. Finally, in the present case prevailing temperatures of individual generator components are also detected using the temperature measuring devices 11 which are arranged inside the generator 2 and the average value of the detected temperatures is formed, which average value is transmitted to the control device 9 and taken into account in the controlling. Via the control device 9, the actuating drive 7 of the control valve 8 is finally operated in order to alter the volumetric flow of the cooling liquid and therefore the cooling capacity of the cooler 3 in such a way that the prevailing cold gas temperature is adapted to the cold gas temperature setpoint value.

During on-load operation of the generator 2, the basic task of the previously described cold gas temperature controlling entails providing an adequate cooling capacity in order to compensate load change processes. It is the primary aim of the controlling in this case to achieve a generator 2 which is as hot as possible in order to reduce thermomechanical loads of the generator components. At low loads, the cold gas temperature setpoint value has to be correspondingly increased, at high loads correspondingly reduced, in order to keep the temperature level inside the generator as high and constant as possible regardless of the type of load operation (full load or partial load).

When the generator 2 is being run down with subsequent turning operation without intended shutting down, that is to say for achieving a so-called hot standby mode, it is desirable to maintain a temperature level which is as high as possible inside the generator 2 in order to bridge the turning operation. To this end, the volumetric flow of the cooling liquid is set to minimum in the case of low stator and rotor current. In the case of turning operations of frequently long duration, it can be advantageous to temporarily use the cooler 3 as a heating device in order to supply heat to the generator 2. This can be achieved for example via the circuit 15, shown by dashed lines in FIG. 1, which has a cooling liquid branch line 16, which branches from the cooling liquid line 6 upstream of the cooler 3 and joins with this again between the cooler 3 and the control valve 8, and also a heating device 16 and a separate delivery device 5. In the circuit which is formed when the control valve 8 is shut off, the circulating cooling liquid can be heated by means of the heating device 16 and the absorbed heat in the cooler 3 can be yielded to the cooling gas.

When the generator 2 is being run down with subsequent turning operation and shutdown of short duration, it is the aim to ensure a quick and adequate cooling of the generator 2, especially of its rotor, in order to compensate thermally different expansion coefficients of the materials of the generator components and to counteract thermal expansions. To this end, the volumetric flow of the cooling liquid which is fed to the cooler 3 is to be selected as high as possible, which can be carried out by means of a separate control program which can be activated by the operating personnel and renders the previously described controlling inoperative.

Figure 3:
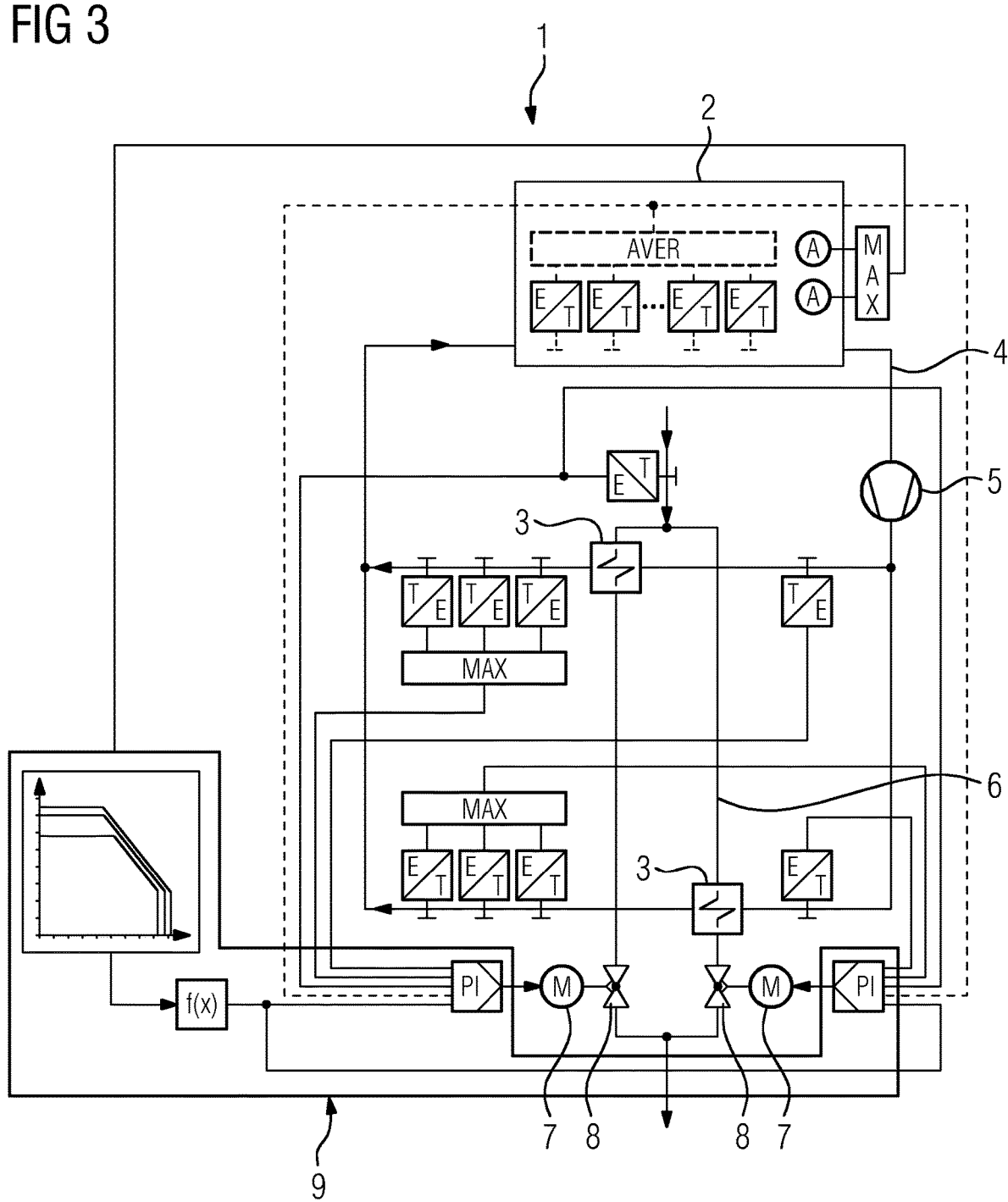
FIG. 3 shows a schematic view of an alternative cooling gas circuit 1 and of a control system which controls the cold gas temperature of the cooling gas which flows through the cooling gas circuit.

FIG. 3 shows an alternative generator cooling circuit 1 which in the main differs from the generator cooling circuit 1 shown in FIG. 1 to the effect that provision is made for two coolers 3 which are arranged in parallel, as a result of which reliability and also cooling capacity are increased. Although it is not shown in FIG. 3, the depicted arrangement can also be provided with a correspondingly adapted circuit 15.

FIG. 4 shows by way of example a possible arrangement of temperature measuring devices 11, designed as slot resistance thermometers, in a stator plate packet 17 of the generator 2, in which arrangement the temperature measuring devices 11 are positioned in each case in the region of cooling grooves 19 which are provided between the plates 18 and through which flows cooling gas.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF DESIGNATIONS

1 Generator cooling circuit
2 Generator
3 Cooler
4 Cooling gas line
5 Delivery device
6 Cooling liquid line
7 Actuating drive
8 Control valve
9 Control device
10 Current measuring device
11 Temperature measuring device
12 Line
13 Line
14 Line
15 Circuit
16 Heating device
17 Stator plate packet
18 Plate
19 Cooling groove

The invention claimed is:

1. A method for controlling the cold gas temperature of a cooling gas of a closed cooling gas circuit of a generator, which has at least one cooler through which flows a cooling liquid,
wherein the method comprises the steps:
a) defining cold gas temperature setpoint values in dependence of stator and rotor current of the generator, wherein the cold gas temperature setpoint values especially have a predetermined margin in relation to cold gas thermal protection values of a protection system of the generator;
b) detecting the prevailing cold gas temperature;
c) detecting the prevailing stator and rotor current;
d) determining the cold gas temperature setpoint value which is associated with the stator and rotor current detected in step c);
e) controlling the cold gas temperature by altering the volumetric flow of the cooling liquid which is fed to the at least one cooler in dependence of the difference between the prevailing cold gas temperature detected in step b) and the cold gas temperature setpoint value determined in step d); and
f) repeating steps b) to e) within defined time intervals.

2. The method as claimed in claim 1,
wherein
the cold gas temperature setpoint values defined in step a) in dependence of the stator and rotor current of the generator lie below the corresponding cold gas thermal protection values.

3. The method as claimed in claim 1, wherein
the prevailing cold gas temperature is detected in step b) at a number of positions at the same time and only the maximum prevailing cold gas temperature is taken into consideration during the controlling in step e).

4. The method as claimed in claim 1, wherein
the maximum value of the detected prevailing stator current and the detected prevailing rotor current is determined in step c), and
in that the cold gas temperature setpoint value associated with the maximum value is determined in step d).

5. The method as claimed in claim 1, wherein
the prevailing hot gas temperature is detected and taken into consideration during the controlling in step e).

6. The method as claimed in claim 5,
wherein
the prevailing hot gas temperature is detected at a number of positions at the same time and only the maximum prevailing hot gas temperature is taken into consideration during the controlling in step e).

7. The method as claimed in claim 1, wherein
the prevailing cooling liquid temperature is detected before entry into the cooler and taken into consideration during the controlling in step e).

8. The method as claimed in claim 1, wherein
the prevailing stator and/or rotor current of the generator is detected and taken into consideration during the controlling in step e).

9. The method as claimed in claim 1, wherein
in the case of directly gas-cooled stator winding bars the prevailing cooling gas temperature is detected at the bar exit of the stator winding of the generator and taken into consideration during the controlling in step e).

10. The method as claimed in claim 1, wherein
the differential of stator current or rotor current to the time is determined and taken into consideration as a vanishing impulse during the controlling in step e).

11. The method as claimed in claim 1, wherein
the generator cooling circuit has a plurality of coolers and in that the volumetric flows of the cooling liquid which are fed to the respective coolers are altered in step e).

12. The method as claimed claim 1, wherein
a heating device is provided for optional heating of the cooling liquid which enters the cooler.

13. The method as claimed in claim 1, wherein
the generator cooling circuit is a component part of a power plant.

* * * * *